United States Patent [19]

Duchrow

[11] Patent Number: 4,699,293
[45] Date of Patent: Oct. 13, 1987

[54] ENCLOSURE SEAL

[75] Inventor: Robert A. Duchrow, Milwaukee, Wis.

[73] Assignee: Allen-Bradley Company, Inc., Milwaukee, Wis.

[21] Appl. No.: 811,892

[22] Filed: Dec. 20, 1985

[51] Int. Cl.⁴ .............................................. B65D 53/00
[52] U.S. Cl. .................................... 220/378; 220/3.8; 277/165; 277/166; 277/236
[58] Field of Search ................. 220/378, 3.8; 200/302; 174/52 R, 53, 66; 277/165, 166, 236; 49/475, 479, 486

[56] References Cited

U.S. PATENT DOCUMENTS

| | | |
|---|---|---|
| 924,039 | 6/1909 | Clark . |
| 1,583,126 | 5/1926 | Crane . |
| 1,821,866 | 9/1931 | Wilson . |
| 1,873,855 | 8/1932 | Wilson . |
| 2,815,549 | 12/1957 | Olson . |
| 3,395,260 | 7/1968 | Hamlin .............................. 200/168 |
| 3,396,712 | 8/1968 | Sakraida et al. ....................... 49/479 |
| 3,441,166 | 4/1969 | De Frees ............................. 220/378 |
| 4,158,757 | 6/1979 | Reichert et al. .................... 200/302 |
| 4,228,917 | 10/1980 | Sowell ................................. 220/378 |

Primary Examiner—George T. Hall
Attorney, Agent, or Firm—Quarles & Brady

[57] ABSTRACT

A seal for an enclosure of electrical equipment which is clamped between sealing surfaces on the enclosure base and the enclosure cover. The seal includes a cavity of a preferred hour-glass configuration and resiliently retains a resilient seal member of a preferred triangular configuration. The outer wall portions of the cavity permit expansion of the resilient seal member when the cover is forced against the base to provide a seal around the outer periphery of the enclosure.

14 Claims, 5 Drawing Figures

ENCLOSURE SEAL

BACKGROUND OF THE INVENTION

The field of the invention is enclosures for electrical equipment, and particularly, enclosures which seal electrical equipment from the surrounding environment.

There are numerous applications where electrical devices such as switches, relays and terminal blocks must be sealed off from the surrounding environment. Such seals may, for example, exclude liquids such as water where the equipment is exposed to the weather or it may inhibit the passage of gases where the equipment is exposed to volatile vapors. Standards have been established for seals of various types and it is, of course, an objective in the art to meet these standards with any proposed structure.

Standards for sealed enclosures may take the form of specific structural requirements or they may take the form of performance requirements. One such structural standard requires that the juncture between two parts of an enclosure be formed by metal against metal, with the metal having a specified width. On the other hand, to meet certain performance standards it has been found that rings of elastomeric material must be used at the junction of two enclosure parts.

Although prior enclosures are typically designed to meet a specific standard, there are some enclosures available which meet more than one standard. For example, there is described in U.S. Pat. No. 4,158,757, which is commonly assigned, an enclosure seal which includes a metal frame which is clamped between sealing surfaces on an enclosure base and the enclosure cover. Another type of such enclosure, for example, provides a metal flange at the juncture of its base and cover with a rubber O-ring clamped between the mating flange surfaces. In seals of the latter type, it is common to provide grooves in each flange surface to receive the O-ring. This is disadvantageous as two such grooves must be provided. In addition, the O-ring must be aligned with the opposing grooves and this can cause both an installation and sealing problem.

SUMMARY OF THE INVENTION

The present invention relates to an improved seal for an enclosure. It includes a cavity disposed in one of the sealing surfaces of the enclosure cover or enclosure base. The cavity is constructed and arranged for both retaining a resilient seal member therein and permitting compressive expansion thereof in the same cavity. The seal also includes the resilient seal member having at least one portion for sealing engagement with one of the sealing surfaces when a cover is fastened in place over a compartment. In a preferred manner, the cavity has inwardly extending and diverging wall portions terminating in an end wall as well as outwardly extending and diverging wall portions resulting in a constricting portion between the wall portions. Also preferably the resilient member is constructed and arranged to be resiliently positioned between the inwardly extending wall portions and to expand into the outwardly extending wall portions when compressed by an opposing sealing surface.

A general object of the invention is to provide a metal-to-metal seal and an elastomeric seal for an enclosure of electrical equipment. The elastomeric seal is provided by a cavity in one of the sealing surfaces which will allow for initial retention of a resilient member when placed therein yet will allow for expansion of the elastomeric seal into another portion of the cavity when contacted by an opposing sealing surface. The sealing surfaces are provided in the usual surrounding flanges. They are determined by the applicable standard and they mate with the sealing surfaces on the enclosure base and cover to provide the desired metal-to-metal seal.

An object of the invention is to provide an elastomeric seal without increasing the cost of the enclosure. This is accomplished by machining a single cavity in one of the sealing surfaces of the enclosure while eliminating an opposing cavity in the opposing sealing surface as well as orientation of the elastomeric seal therewith.

Yet another object of the invention is to facilitate the placement of an elastomeric seal in an enclosure with a metal-to-metal seal. The cavity and the elastomeric seal are constructed and arranged so that a slight compression with insertion of the elastomeric seal into a portion of the cavity will effect retention. This results in ease of installation and at the same time obviates misplacement of the elastomeric seal when the cover and base are separated.

A more specific object of the invention is to obviate the fabrication of additional component parts such as fastening members for the elastomeric seal or the use of a retentive adhesive.

The foregoing and other objects and advantages of the invention will appear from the following description. In the description reference is made to the accompanying drawing which forms a part hereof, and in which there is shown by way of illustration a preferred embodiment of the invention. Such embodiment does not necessarily represent the full scope of the invention, however, and reference is therefore made to the claims herein for interpreting the scope of the invention.

DESCRIPTION OF THE PREFERRED EMBODIMENT

Figure 1:
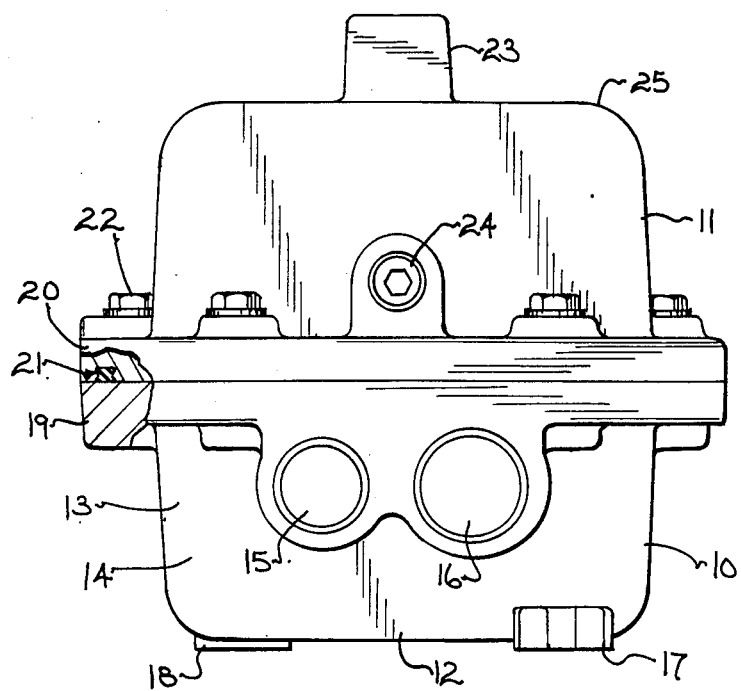
FIG. 1 is a top view of an enclosure with a portion broken away to illustrate the seal of the present invention.

Referring to FIG. 1, an enclosure for a handle controlled switch or the like includes a base 10 and a cover, or top 11. The base 10 is of a generally rectangular configuration and is cast from aluminum. It includes a bottom 12 and upright walls such as 13 which define a compartment 14 for an electrical device. The handle controlled switch or other electrical device is mounted within the compartment 14 and it is connected to other devices (not shown in the drawings) through openings 15 and 16 formed in the end wall 13. A control wiring conduit opening 17 is provided through the bottom and a mounting flange 18 extends therefrom. Surrounding the compartment 14 is a peripheral flange 19.

The generally rectangular cover 11 is also cast from aluminum. It also has a peripheral flange 20 which is arranged to mate with the flange 19. The seal generally 21 is housed in the flange 20 for sealing engagement with the flange 19. Bolts 22 are of the quick release type. They are inserted through appropriate openings in the flange 20 and are threadably fastened in the flange 19 to secure the top 11 to the base 10. A switch control handle 23 operatively extends through the cover 11 in the usual manner for connection with an enclosed electrical device. A breather device 24 is also provided through the wall 25 of the cover 11.

Figure 2:
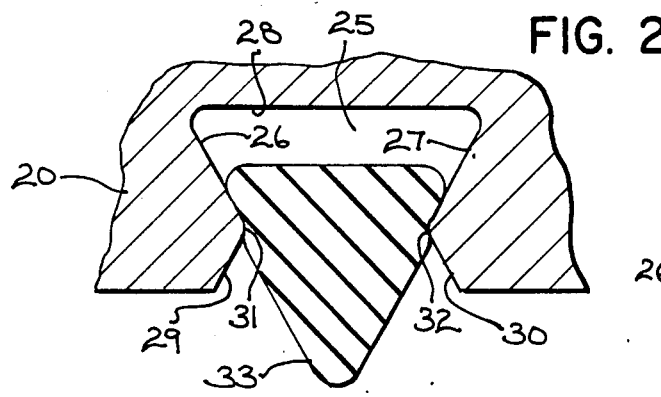
FIG. 2 is an enlarged partial view in horizontal cross section of the invented seal showing the elastomeric seal being positioned in the seal cavity.
Figure 3:
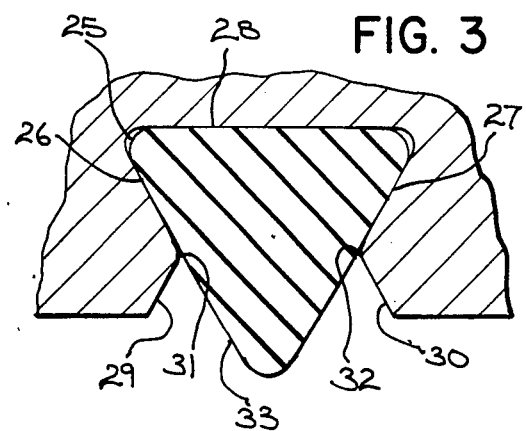
FIG. 3 is a view similar to FIG. 2 showing the elastomeric seal seated in the cavity.
Figure 4:
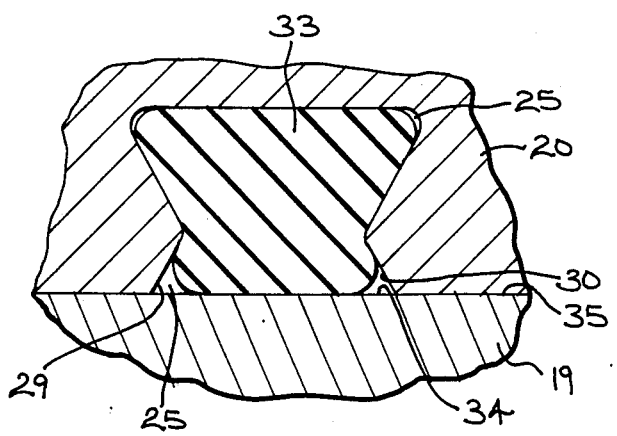
FIG. 4 is a view similar to FIG. 3 illustrating the elastomeric seal compressed by an opposing sealing surface.

Referring to FIGS. 2–4, the seal 21 includes a cavity 25 which is substantially hour-glass in configuration. It has the opposing inwardly extending and diverging wall portions 26 and 27 terminating in an end wall 28. The cavity 25 is also defined by the outwardly extending and diverging wall portions 29 and 30 resulting in constricting portions 31 and 32. An elastomeric and resilient seal member 33 has portions which are dimensioned larger than the distance between the constricting portions 31 and 32. This is best seen in FIG. 2. The seal member is preferably of an equilateral triangular configuration and when fully seated against the end wall 28 will also be resiliently confined between wall portions 26 and 27. This is the retentive state for the seal member 33 before it is contacted by the flange 19 of the base 10.

As shown in FIG. 4, the seal member 33 is in contact with a sealing surface 34 of the flange 19. In this state, sealing surface 34 will force sealing member 33 into the cavity 25 and cause the otherwise conically extending section to assume a compacted state between the outwardly extending wall portions 29 and 30. It should be further pointed out that the mating sealing surface 34 on the flange 19 as well as the mating sealing surface 35 on the flange 20 are highly machined surfaces. These provide a metal-to-metal seal between the flanges 19 and 20 and particularly between the seal member 33 and the inside of the compartment 14.

Figure 5:
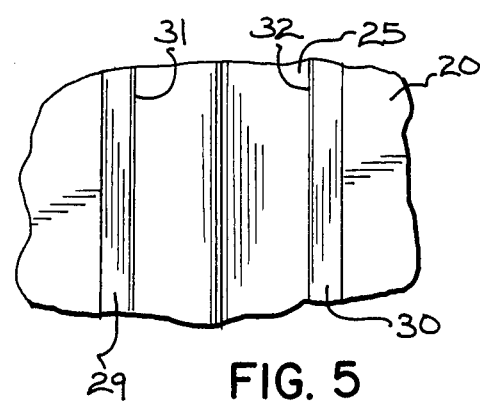
FIG. 5 is a partial view in side elevation of the cavity shown in FIGS. 2, 3 and 4.

FIG. 5 illustrates the cavity 25 formed in the flange 20. The outwardly extending wall portions 29 and 30 not only provide a cavity area for the seal member 33 to expand when contacted by the sealing surface 34 of the flange 19 but also afford a guiding surface for the seal member 33 when placed initially in the cavity 25.

The cavity 25 has a configuration which is substantially hour-glass. It will be noted that wall portions 26 and 27 have a larger wall surface than wall portions 29 and 30. However, the configuration of cavity 25 can be of various geometric configurations with the provision that it afford a retentive cavity portion as well as a portion to accommodate the seal member when it is compressed.

The seal member may be formed from an elastomeric material such as neoprene rubber. The particular material chosen is usually dictated by the proposed end use of the enclosure. For example, use of the enclosure in the petrochemical industry might suggest a fluorocarbon rubber, whereas a silicone rubber might be more appropriate if the enclosure is to be subjected to relatively high temperatures.

Although various sized and shaped seal members 33 are possible, a seal member 33 having the cross-sectional configuration of an equilateral triangle with sides measuring one-quarter inch is preferred regardless of the size of the enclosure. Reliability of the seal has been found to decrease with seal members of smaller dimension and seal members of larger dimensions do not significantly improve performance. Alternatively the seal member 33 could take an hour-glass configuration similar to cavity 25 and with portions slightly larger for sealing contact purposes. This configuration would afford additional resilient material for contact with the sealing surface 34 when the sealing member is compressed.

It can be appreciated that the size and shape of the enclosure can vary considerably from that disclosed herein. The invented seal 21 may therefore take a corresponding number of sizes and shapes. In any case, however, the present invention provides a substantial metal-to-metal seal around the enclosure adjacent to the enclosure compartment, and it provides an elastomeric seal around the outer periphery of the enclosure. The elastomer seal is retained in the flange of the enclosure without adhesives or other fastening devices and is expandable into a cavity formed in the same flange.

I claim:

1. An enclosure for an electrical device, the combination comprising:
   a base having a bottom and one or more upright walls which define a compartment for receiving the electrical device;
   a first sealing surface formed on said upright wall and surrounding said compartment;
   a cover having a second sealing surface which opposes and contacts said first sealing surface when said cover is positioned in place over said cavity;
   a seal disposed between said opposing first and second sealing surfaces, said seal also including a cavity disposed in one of said base or cover, said cavity defined by an nner portion and an outer portion and constructed and arranged for both retaining a resilient seal member therein and permitting compressive expansion thereof, said seal also including said resilient seal member having at least one portion for extending from said cavity and for sealing engagement with one of said sealing surfaces when said cover is fastened in place over said compartment said seal member constructed and arranged to be guided by said outer portion and self orientated by said inner portion of said cavity.

2. The enclosure as defined in claim 1 wherein said cavity has opposing inwardly extending and diverging wall portions terminating in an end wall as well as outwardly extending and diverging wall portions resulting in a constricting portion between said wall portions.

3. The enclosure as defined in claim 1 wherein said seal is disposed in said cover.

4. The enclosure as recited in claim 3 in which said sealing surfaces are flat and said seal is positioned adjacent said sealing surfaces.

5. The enclosure as recited in claim 1 in which said first and second sealing surfaces and said seal are positioned in a flanged portion surrounding said base and said cover.

6. The enclosure as recited in claim 2 wherein said cavity has a configuration which is substantially hour-glass.

7. The enclosure as recited in claim 6 wherein said inwardly extending wall portions of said cavity have a larger wall surface than said outwardly extending wall portions.

8. The enclosure as recited in claim 7 wherein said resilient seal member is of a generally equilateral triangular configuration in cross-section.

9. The enclosure as recited in claim 8 wherein said base and said cover are composed of a metallic material and said resilient seal member is composed of a solid elastomeric material.

10. A seal for an assembly having two elements to be joined at mating surfaces with said mating surfaces being relatively flat comprsing:
a cavity defined by an inner portion and an outer portion disposed in one of said mating surfaces, said cavity constructed and arranged for both retaining a resilient seal member therein and permitting compressive expansion thereof, said seal also including said resilient seal member having at least one portion for sealing engagement with one of said mating surfaces when said relatively flat mating surfaces are in contact, said seal member being of a substantially solid configuration in cross section so that it is self orientated and self retained in said inner portion and compressively expanded in said outer portion of said cavity.

11. The seal as recited in claim 10 wherein said cavity has opposing inwardly extending and diverging wall portions terminating in an end wall as well as outwardly extending and diverging wall portions resulting in a constricting portion between said wall portions.

12. The seal as recited in claim 10 wherein said seal is disposed in a cover member.

13. The seal as recited in claim 10 wherein said cavity has a configuration which is substantially hourglass.

14. The seal as recited in claim 13 wherein said resilient seal member is of a generally equilateral triangular configuration in cross section and is composed of an elastomeric material.

* * * * *